US007852778B1

(12) United States Patent
Kompella

(10) Patent No.: US 7,852,778 B1
(45) Date of Patent: Dec. 14, 2010

(54) VERIFICATION OF NETWORK PATHS USING TWO OR MORE CONNECTIVITY PROTOCOLS

(75) Inventor: Kireeti Kompella, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 1061 days.

(21) Appl. No.: 11/525,685

(22) Filed: Sep. 22, 2006

Related U.S. Application Data

(60) Provisional application No. 60/763,420, filed on Jan. 30, 2006.

(51) Int. Cl.
*H04J 1/16* (2006.01)
(52) U.S. Cl. .................. 370/248; 370/242; 370/252
(58) Field of Classification Search ............ 370/248, 370/396, 400, 254, 242, 252
See application file for complete search history.

(56) References Cited

U.S. PATENT DOCUMENTS

| 7,433,320 B2* | 10/2008 | Previdi et al. ............ 370/248 |
| 7,447,167 B2* | 11/2008 | Nadeau et al. ............ 370/254 |
| 7,561,527 B1* | 7/2009 | Katz et al. ................ 370/241 |
| 7,765,306 B2* | 7/2010 | Filsfils et al. ............ 709/228 |
| 2002/0093954 A1* | 7/2002 | Weil et al. ................ 370/389 |
| 2003/0112749 A1* | 6/2003 | Hassink et al. ............ 370/225 |
| 2005/0281192 A1* | 12/2005 | Nadeau et al. ............ 370/217 |
| 2006/0133300 A1* | 6/2006 | Lee et al. ................ 370/254 |
| 2006/0262772 A1* | 11/2006 | Guichard et al. ............ 370/351 |
| 2006/0285500 A1* | 12/2006 | Booth et al. ............ 370/250 |
| 2007/0165515 A1* | 7/2007 | Vasseur ................ 370/216 |
| 2008/0247324 A1* | 10/2008 | Nadeau et al. ............ 370/245 |

OTHER PUBLICATIONS

Rahul Aggarwl; ("OAM Mechanisms in a MPLS Layer 2 Transport Networks"; 2004;IEEE Communications Magazine; pp. 124-130.*

* cited by examiner

*Primary Examiner*—Ricky Ngo
*Assistant Examiner*—Dewanda Samuel
(74) *Attorney, Agent, or Firm*—Shumaker & Sieffert, P.A.

(57) ABSTRACT

Techniques are described for verifying a status of a set of paths through a computer network for two or more connectivity protocols. For example, a node uses a first connectivity protocol to concurrently learn information that will cause packets conforming to the first connectivity protocol and packet conforming to a second connectivity protocol to traverse a set of paths through a computer network. After learning this information, the node may verify a status of each of the paths using the first connectivity protocol. In addition, the node may verify a status of each of the paths using the second connectivity protocol. By verifying the status of the paths using both the first and the second connectivity protocols, the node may be able to quickly and accurately determine whether a path has failed.

35 Claims, 8 Drawing Sheets

VERIFICATION OF NETWORK PATHS USING TWO OR MORE CONNECTIVITY PROTOCOLS

This application claims the benefit of U.S. Provisional Application No. 60/763,420, filed Jan. 30, 2006, the entire content of which is incorporated herein by reference.

TECHNICAL FIELD

The invention relates to computer networks, and, in particular, to connection verification in computer networks.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The links and nodes the message passes through while traveling from the first node to the second node is referred to as a path. For example, suppose the message passes through a third node while traveling from the first node to the second node. In this case, the path leads from the first node to the third node to the second node.

Packet-based computer networks increasingly utilize label switching protocols for traffic engineering and other purposes. In a label switching network, label switching routers (LSRs) use Multi-Protocol Label Switching (MPLS) signaling protocols to establish label switched paths (LSPs). The LSRs utilize MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR.

Links and nodes in a computer network may fail without warning. Consequently, one of the LSPs that the first node was using to communicate with the second node may stop functioning. To ensure that the first node and the second node do not send messages on a LSP that is not functioning, the nodes may periodically verify the status of the path by sending a message through the path and receiving a response through the path.

In some situations, however, verifying the connectivity along the LSPs may be difficult. For example, verifying the connectivity along the LSPs may be difficult where LSP traffic is dynamically load balanced over multiple paths using equal cost multi-path (ECMP) or other mechanisms. In this situation, verification over each of the multiple paths of an LSP may require continual use of a complex, resource intensive connectivity protocol. For example, a node may use the Label Switched Path Ping (LSP Ping) protocol to verify each of the LSPs.

SUMMARY

In general, the invention is directed to techniques of verifying the connectivity status of multiple paths through a computer network. The techniques may be useful in testing the connectivity of label switched paths (LSPs), and particularly useful where LSP traffic is load balanced over multiple paths using equal cost multi-path (ECMP) or other mechanisms.

According to the techniques, a first node in the computer network uses a first connectivity protocol to learn one or more paths through the computer network from the first node to a second node. The first node also learns information that, when included in a packet conforming to a first connectivity protocol, causes the packet to traverse one of the paths. Concurrently, the first node learns information that, when included in a packet conforming to a second connectivity protocol, causes the packet to traverse one of the paths. That is, the first node does not need to use the second connectivity protocol to learn such information. The first node may then verify the connectivity status of each of the paths using the first connectivity protocol and may also verify the connectivity status of each of the paths through the network using the second connectivity protocol.

For example, in certain embodiments, the first connectivity protocol is the label switched path (LSP) ping protocol and the second connectivity protocol is the Bidirectional Forwarding Detection (BFD) protocol. LSP ping exploration packets are used to discover paths between a source node and a target node along one or more LSPs. As described herein, the LSP ping protocol can be extended to concurrently discover packet header information necessary to direct packets along the paths for both connectivity protocols. In other words, in one embodiment, the techniques of this invention allow a first node to use the LSP ping protocol to determine paths through a network for a multi-path LSP, and concurrently determine packet header information necessary to direct LSP ping packets as well as BFD packets along each path.

After learning the packet headers of the paths through the network for the BFD protocol and the LSP ping protocol, the first node may use either or both of the LSP ping protocol and the BFD protocol to monitor and verify the connectivity status of each of the paths of an LSP from the first node to a second node. For example, using the packet headers learned during the LSP ping exploration process, the first node may periodically use the LSP ping protocol, but primarily rely on the BFD protocol, which is a more efficient, less resource intensive protocol for testing connectivity.

In one embodiment, a method comprises using a first connectivity protocol to concurrently learn information that will cause packets conforming to the first protocol and packets conforming to a second connectivity protocol to traverse individual paths through a computer network. The method also comprises outputting packets according to the second connectivity protocol at a first rate in accordance with the learned information to perform a first verification of the status of each of the paths.

In another embodiment, a network device comprises a network exploration module to concurrently learn information that will cause packets conforming to the first connectivity protocol and packets conforming to a second connectivity protocol to traverse individual paths in a set of paths through a computer network. In addition, the network device comprises a first module to output packets according to the second connectivity protocol at a first rate in accordance with the learned information to perform a first verification of the status of each of the paths.

In another embodiment, the invention is directed to a computer-readable medium containing instructions. The instructions cause a programmable processor to use a first connectivity protocol to concurrently learn information that will cause packets conforming to the first connectivity protocol and packets conforming to a second connectivity protocol to traverse individual paths in a set of paths through a computer network. The instructions also cause the processor to output packets according to the second connectivity protocol at a first rate in accordance with the learned information to perform a first verification of the status of each of the paths.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
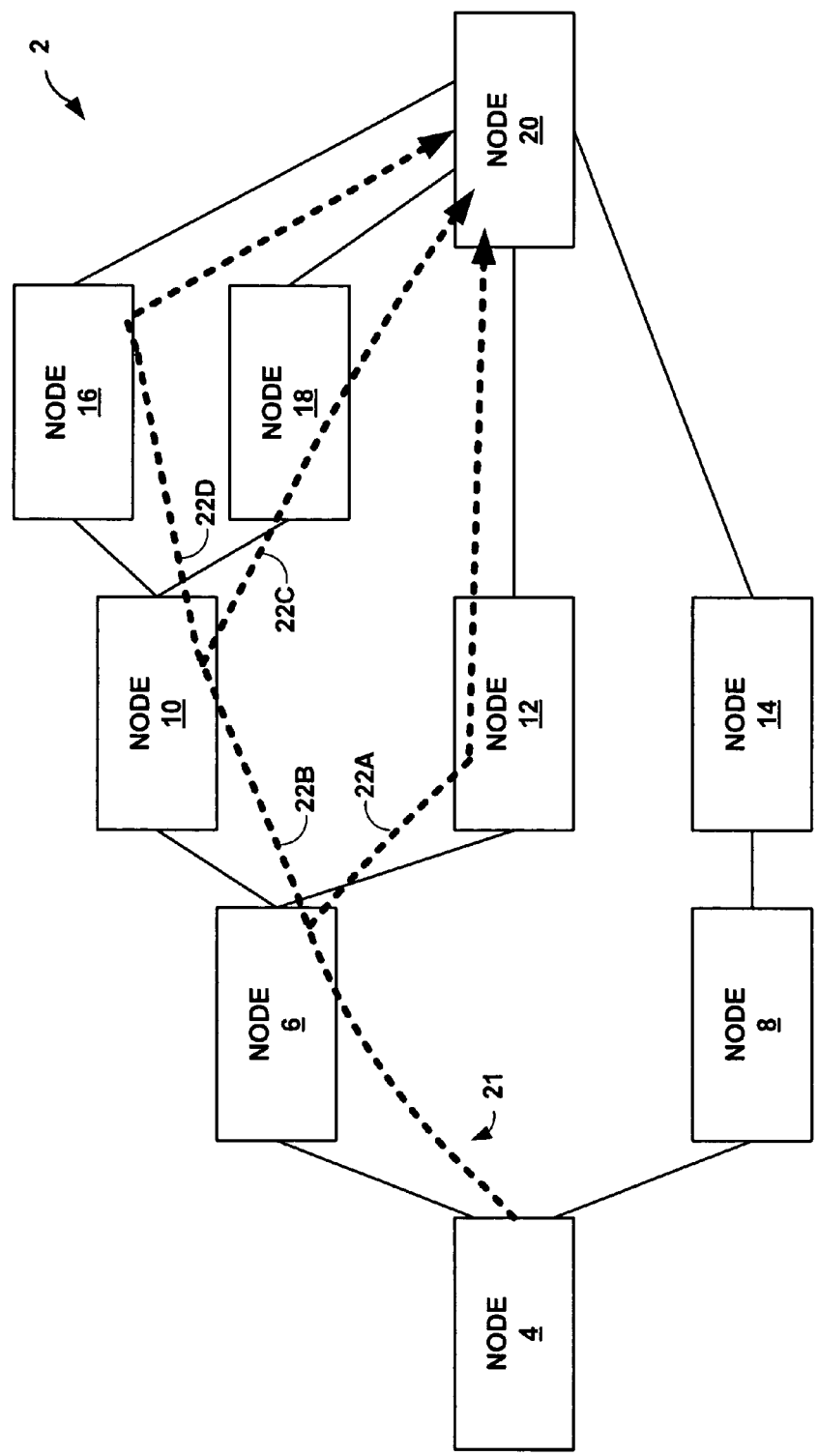
FIG. 1 is a block diagram illustrating an exemplary computer network.

FIG. 1 is a block diagram illustrating an exemplary computer network 2. Nodes 4 through 20 may represent a wide range of network devices. For example, nodes 4 through 20 may be routers, switches, personal computers, servers, modems, network telephones, televisions, television set-top boxes, firewall devices, communications satellites, network appliances, and other network-enabled devices.

Nodes 4 through 20 are connected to one another through links represented by lines. For instance, node 4 is connected to nodes 6 and 8. The links may be any type of computer network transmission medium. For instance, a link in computer network 2 may be a fiber optic cable, an Ethernet cable, a coaxial cable, a universal serial bus cable, a wireless connection, and so on.

In the example of FIG. 1, a label switched path (LSP) 21 conveys network traffic from a source node 4 to a destination node 20. In this example, traffic traversing LSP 21 is load-balanced across the multiple paths 22A-22D using equal cost multi-path (ECMP) or other mechanisms. For example, node 6 may load balance Multi-protocol label switch (MPLS) traffic traversing LSP 21 across paths 22A and 22B. Similarly, node 10 load balances MPLS traffic traversing LSP 21 across paths 22C and 22D.

While computer network 2 is operating, a link or a node in computer network 2 may fail. For example, a storm may sever the link between node 12 and node 20. As another example, a power failure or a programming fault may cause node 10 to stop functioning. Failure of a link or node may occur without warning to nodes that use the link or node to communicate. Consequently, for a period of time, a node may continue sending messages through a path that is no longer functioning. Packets sent through such a path may be lost or delayed.

In accordance with the techniques of the invention, source node 4 utilizes a plurality of connectivity protocols to monitor and verify that each of paths 22 of LSP 21 are working properly. For example, in one embodiment, source node 4 utilizes the LSP ping protocol as a first connectivity protocol to probe LSP 21 to learn of the multiple paths 22 and provide extensive testing of each path 22 along LSP 21. LSP ping provides an extensive mechanism for probing and testing the verifying the data plane of LSP 21 against the control plane. However, due to the overhead and resource consumption of LSP ping, source node 4 may execute an extensive LSP ping test of LSP 21 at a low frequency, e.g., once every minute.

In addition, source node 4 may utilize the Bidirectional Forwarding Detection (BFD) protocol as a second connectivity protocol that provides a more efficient yet potentially less accurate connectivity test for paths 22 of LSP 21. For example, source node 4 may utilize the BFD protocol to detect a data plane failure in the forwarding path of LSP 21. Although the BFD protocol cannot be used to verify the MPLS control plane against the data plane, BFD can be used, as described herein, to detect data plane failures.

In other words, source node 4 may utilize the BFD protocol as a light-weight means of testing only the data plane. The light-weight nature of the BFD protocol may allow source node 4 to implement the BFD protocol in hardware or firmware. The BFD protocol may provide faster detection with sub-second granularity of data plane failures, and may be used for a greater number of LSPs. For example, source node 4 may execute a low-cost BFD test of LSP 21 at a higher frequency, e.g., once every 10 milliseconds, between iterations of the more extensive LSP ping protocol used to periodically verify the control plane against the data plane by re-synchronizing MPLS LSP 21 and Forwarding Equivalence Class (FEC) mappings.

Moreover, according to the techniques, source node 4 uses LSP ping exploration packets according to the LSP ping protocol (i.e., a first connectivity protocol) to learn of paths 22 and concurrently learn information that will cause packets conforming to the LSP ping protocol as well as packets conforming to BFD protocol to traverse the paths 22. Consequently, source node 4 does not need to use the BFD protocol to learn information that will cause packets conforming to the BFD protocol to traverse paths 22.

More specifically, as described herein, the LSP ping protocol may be extended to concurrently discover packet header information necessary to direct packets along paths 22 for both connectivity protocols. In one embodiment, the techniques of this invention allow source node 4 to use the LSP ping protocol to determine paths through a network for a multi-path LSP, and concurrently determine packet header information necessary to direct LSP ping packets as well as BFD packets along each of paths 22.

Thus, source node 4 may be viewed as using LSP-ping to boot-strap a BFD session. The initiation of fault detection for a particular <MPLS LSP, FEC> combination results reply packets, in the ping mode, between the ingress and egress LSRs for that <MPLS LSP, FEC> (nodes 4, 10 in the example of FIG. 1). An LSP-ping echo request from source node 4 and echo reply messages from intermediate nodes along LSP 21 carry a BFD discriminator TLV for the purpose of session establishment.

After using LSP ping to learn the packet header information necessary to direct test packets along all paths 22 for both the BFD protocol and the LSP ping protocol, the source node 4 may use either or both of the LSP ping protocol and the BFD protocol to monitor and verify the connectivity status of each of paths 22. For example, using the packet header information learned during the LSP exploration process, source node 4 may periodically use the LSP ping protocol, but primarily rely on the BFD protocol, which is a more efficient, less resource intensive protocol for testing connectivity. For example, source node 4 may output LSP ping packets at a first rate (e.g., once every minute) in accordance with the learned packet header information to perform a first verification of a connectivity status of each of paths 22. In addition, source node 4 may output BFD packets at a second rate (e.g., every 10 milliseconds) in accordance with the learned packet header information to perform a higher frequency verification of the status of each of paths 22.

The techniques of this invention may present one or more advantages. For example, the size of packets in the second connectivity protocol (e.g., BFD) may be very limited relative to the size of packets conforming to the first connectivity protocol (e.g., LSP ping). This may make the second connectivity protocol very efficient by reducing computation and signaling time. However, packets conforming to the second connectivity protocol may be limited in use, and not useable for exploration. In this situation, the invention may allow source node 4 to use an extended first connectivity protocol to learn of paths 22 and information (e.g., packet header information) necessary to direct packets for both connectivity protocols along the paths. In this manner, embodiments of the invention may utilize multiple connectivity protocols to monitor and verify connectivity for multiple paths, e.g., multi-path LSP 21, where bypass LSPs or MPLS pseudo wires may be used.

Figure 2:
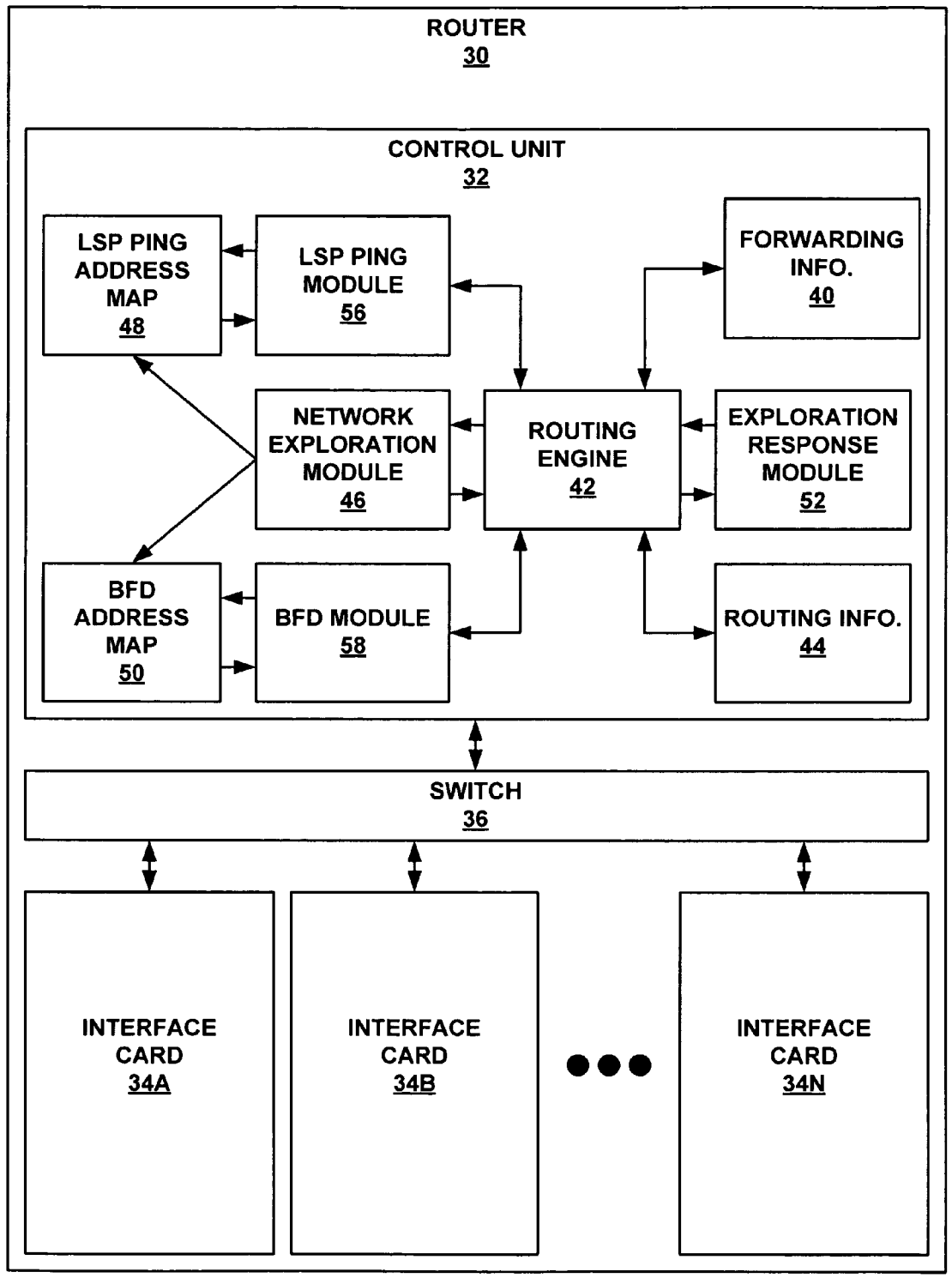
FIG. 2 is a block diagram illustrating an exemplary embodiment of a node in the computer network shown in FIG. 1.

FIG. 2 is a block diagram illustrating an exemplary embodiment of a node in computer network 2 (FIG. 1). For example, a network device may embody a node of computer network 2. This network device may comprise a label switching router 30, and may represent source node 4 of FIG. 1. For example, router 30 may use any of a variety of protocols, e.g., the Label Distribution Protocol (LDP) or the Route Reservation Protocol (RSVP), to establish LSP 21 to communicate network traffic to a destination node 20. For example, the network traffic may comprise Multi-protocol label switching (MPLS) traffic carrying Voice over Internet Protocol (VoIP) data, audio and video content, web data, files, virtual private network data, and so on.

In this example, router 30 comprises a control unit 32 and a set of interface cards 34A through 34N (collectively, interface cards 34). Interface cards 34A through 34N contain interface controllers 38A through 38N (collectively, interface controllers 38), respectively. A high-speed switch 36 facilitates communication between control unit 32 and interface cards 34.

Routing engine 42 that maintains routing information 44 to describe a topology of a network, such as computer network 2, and uses that information to derive forwarding information 40. In general, router 30 receives packets from the computer network through interface cards 34. When an interface card, e.g., interface card 34A, receives a packet, control unit 32 uses forwarding information 40 to forward the packet. If the packet represents a control plane packet conforming to a routing protocol, routing engine 42 updates routing information 44 and regenerates forwarding information 40.

In addition, router 30 includes two connectivity protocols to monitor and verify the control plane and data plane of the LSPs serviced by the router. In this example, the first connectivity protocol may be the LSP-Ping Protocol provided by LSP ping module 56, and the second connectivity protocol may be the BFD protocol supported by BFD module 58.

Initially, control unit 32 may instruct a network exploration module 46 to initiate an exploration of each LSP serviced by router 30, such as LSP 21. Network exploration module 46 uses the LSP ping protocol to learn information that will cause packets conforming to the LSP ping protocol and packets conforming to the BFD protocol to traverse each of paths 22 through computer network 2 associated with LSP 21. For example, network exploration module 46 may discover with the LSP ping protocol, for each path in the set of paths, packet header information that will cause a packet conforming to the LSP ping protocol to traverse the path and to concurrently discover with the LSP ping protocol, for each path in the set of paths, packet header information that will cause a packet conforming to the BFD protocol to traverse the path. For instance, network exploration module 46 may discover sets of destination addresses in the packet headers for the LSP ping and the BFD protocol.

In a further example, network exploration module 46 may discover a packet header of the LSP ping protocol by sending an exploration packet in accordance with the LSP ping protocol to a second node in computer network 2. The exploration packet may specify a set of variable information (e.g., destination addresses) of a packet header that conforms to the LSP ping protocol. In addition, the network exploration packet may specific a set of variable information (e.g., destination addresses) of a packet header that conforms to the BFD protocol. The exploration packet may also include fixed information of a packet header in the BFD protocol. For instance, the fixed information may comprise a source address, a source or a destination port associated with the BFD protocol, and so on.

Continuing the previous example, network exploration module 46 receives an exploration response packet from the second node in response to the exploration packet. The exploration response packet may specify a subset of the set of variable information of a packet header that conforms to the LSP ping protocol for each node on LSP 21 immediately downstream to the second node. Each of these subsets specify variable information that would direct an LSP ping packet to a node on LSP 21 immediately downstream to the second node. For example, if router 30 is node 4 and node 6 is the second node, an exploration response from node 6 includes a subset of the set of variable information that would direct an LSP ping packet to node 10 and a subset of the set of variable information that would direct an LSP ping packet to node 12. In addition, the exploration response packet may specify a subset of the set of variable information of a packet header that conforms to the BFD protocol for each node on LSP 21 immediately downstream to the second node. Each of these subsets specifies variable information that would direct a BFD packet to a node on LSP 21 immediately downstream to the second node.

After receiving the exploration response packet, network exploration module 46 issues an exploration packet for each node on LSP 21 immediately downstream to the second node. Each of these exploration packets specify the subsets of variable information returned by the second node for a node on LSP 21 immediately downstream to the second node. Network exploration module 46 then receives an exploration response from each of these nodes.

Network exploration module 46 repeats the process of issuing exploration packets to identify each path along the LSP until the egress router of the LSP is reached. Network exploration module 46 then inserts the variable information (e.g., destination prefix or addresses) for paths between router 30 and the destination node for the LSP ping protocol in LSP ping address map 48. In addition, network exploration module 46 inserts the variable information (e.g., destination prefix or addresses) for paths between router 30 and the destination node for the BFD protocol in BFD address map 50.

After network exploration module 46 finishes discovering the destination addresses for the LSP ping and the BFD protocols, routing engine 42 may direct LSP ping module 56 to output packets according to the LSP ping packet at a first rate in accordance with the learned information in LSP ping address map 48 to perform verification of a status of each of paths 22. In addition, routing engine 42 may direct BFD module 58 to output packets according to the BFD connectivity protocol at a second rate in accordance with the learned information in BFD address map 50 to perform a second verification of the status of each of paths 22.

To verify a status of each of paths 22, LSP ping module 56 may send an echo-request or a traceroute packet in the LSP ping protocol on each of paths 22. This packet may have the packet header information associated with the path stored in LSP ping address map 48. For instance, the packet may include packet header information from the subset of the set of variable information (e.g., a destination address) associated with the path. Subsequently, LSP ping module 56 may receive a response to the packet. LSP ping module 56 may then infer the connectivity status of the path based on the receipt of the response, the content of the response, or a combination of the two.

Similarly, BFD module 58 may send a packet in the BFD protocol on each of paths 22. This packet may have the packet header information associated with the path stored in BFD address map 50. For instance, the packet may include information from the subset of the set of variable information (i.e., a destination address) associated with the path. Subsequently, BFD module 58 may receive a response to the packet. BFD module 58 may then infer the connectivity status of the path based on the receipt of the response, the content of the response, or a combination of the two.

Control unit 32 may also include an exploration response module 52. Exploration response module 52 may be designed to receive an exploration packet in the LSP ping protocol. Like the exploration packets sent by network exploration module 46, this exploration packet may include a set of variable information of a packet header in the LSP ping protocol and a set of variable information of a packet header in the BFD protocol. After receiving the exploration packet, exploration response module 52 may generate a subset of the set of variable information for a packet header in the LSP ping protocol. Exploration response module 52 may also generate a subset of the set of the variable information for a packet header in the BFD protocol. A packet containing information from one of the subsets is routed from a node that originated the exploration packet to a node immediately downstream to router 30. Once exploration response module 52 generates the subsets, exploration response module 52 may send the subsets to the node that originated the exploration packet.

Figure 3:
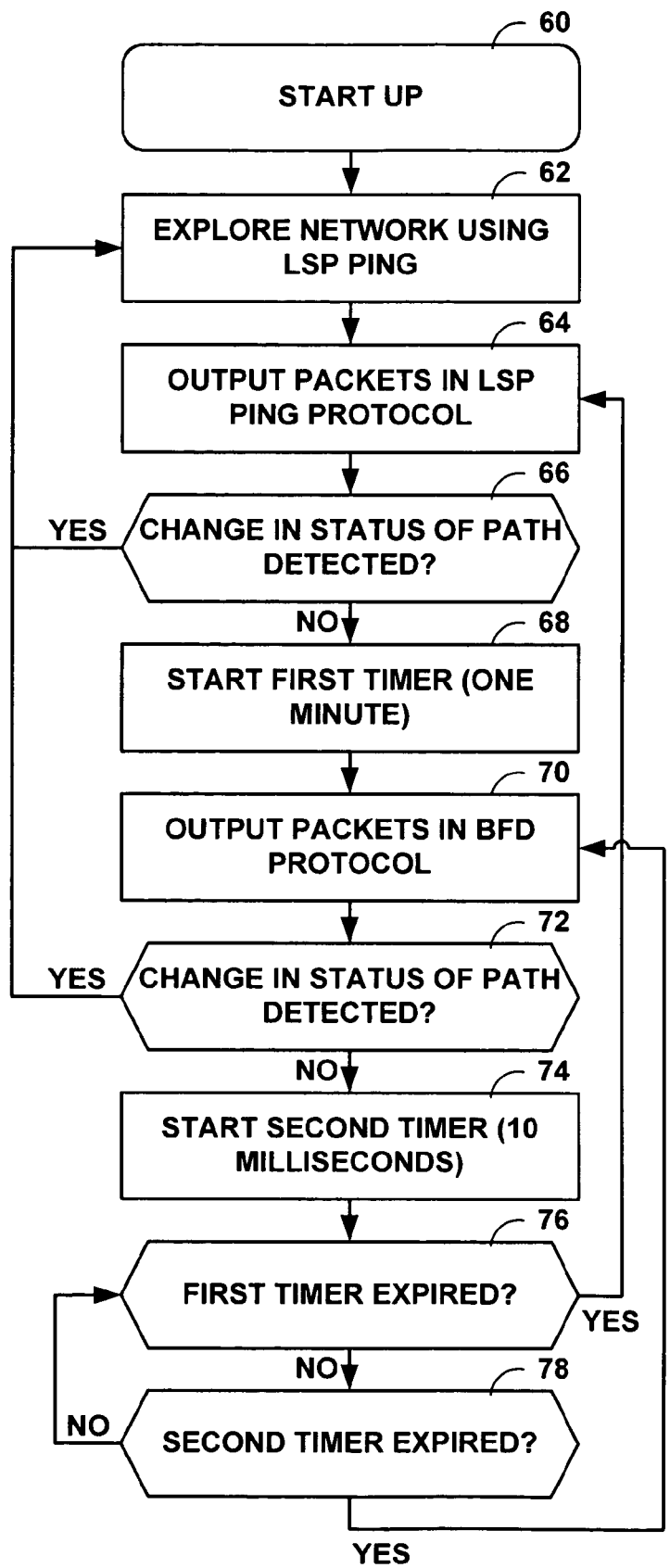
FIG. 3 is a flowchart illustrating an exemplary operation of a routing engine of a node in accordance with the exemplary embodiment shown in FIG. 2.

FIG. 3 is a flowchart illustrating an exemplary operation of a routing engine of a node in accordance with the exemplary embodiment shown in FIG. 2. The operation of routing engine 42 may begin when router 30 is started up (60). After starting, routing engine 42 may direct network exploration module 46 to use the LSP ping protocol to concurrently learn information that will cause packets conforming to the LSP ping protocol and packets conforming to a BFD protocol to traverse each of the paths through computer network 2 from router 30 to a destination node (62).

When network exploration module 46 finishes discovering information, routing engine 42 directs LSP ping module 56 to output packets according to the LSP ping protocol with the learned information in LSP ping address map 48 to perform a first verification of a status of each of the paths through computer network 2 from router 30 to the destination node (64). If LSP ping module 56 detects a change in one of the paths ("YES" of 66), routing engine 42 instructs network exploration module 46 to explore the paths again (62). On the other hand, if LSP ping module 56 does not detect a change in one of the paths ("NO" of 66), routing engine 42 sets a first timer that expires after one minute (68).

Next, routing engine 42 directs BFD module 58 to output packets according to the BFD protocol with the learned information to perform a second verification of the status of each of the paths (70). If BFD module 58 detects a change in one of the paths ("YES" of 72), routing engine 42 instructs network exploration module 46 to explore the paths again (62). On the other hand, if BFD ping module 58 does not detect a change in one of the paths ("NO" of 72), routing engine 42 sets a second timer that expires after ten milliseconds (74).

After setting the second timer, routing engine 42 checks whether the first timer has expired (76). If the first timer has expired ("YES" of 76), routing engine 42 instructs LSP ping module 56 to output packets according to the LSP ping protocol with the learned information to perform a first verification of the status of each of the paths (64). Otherwise, if the first timer has not expired ("NO" of 76), routing engine 42 checks whether the second timer has expired (78). If the second timer has expired ("YES" of 78), routing engine 42 instructs BFD module 58 to output packets according to the BFD protocol with the learned information in BFD address map 50 to perform a second verification of a status of each of the paths (70). On the other hand, if the second timer has not expired ("NO" of 78), routing engine 42 loops back to check whether the first timer has expired (76).

Figure 4:
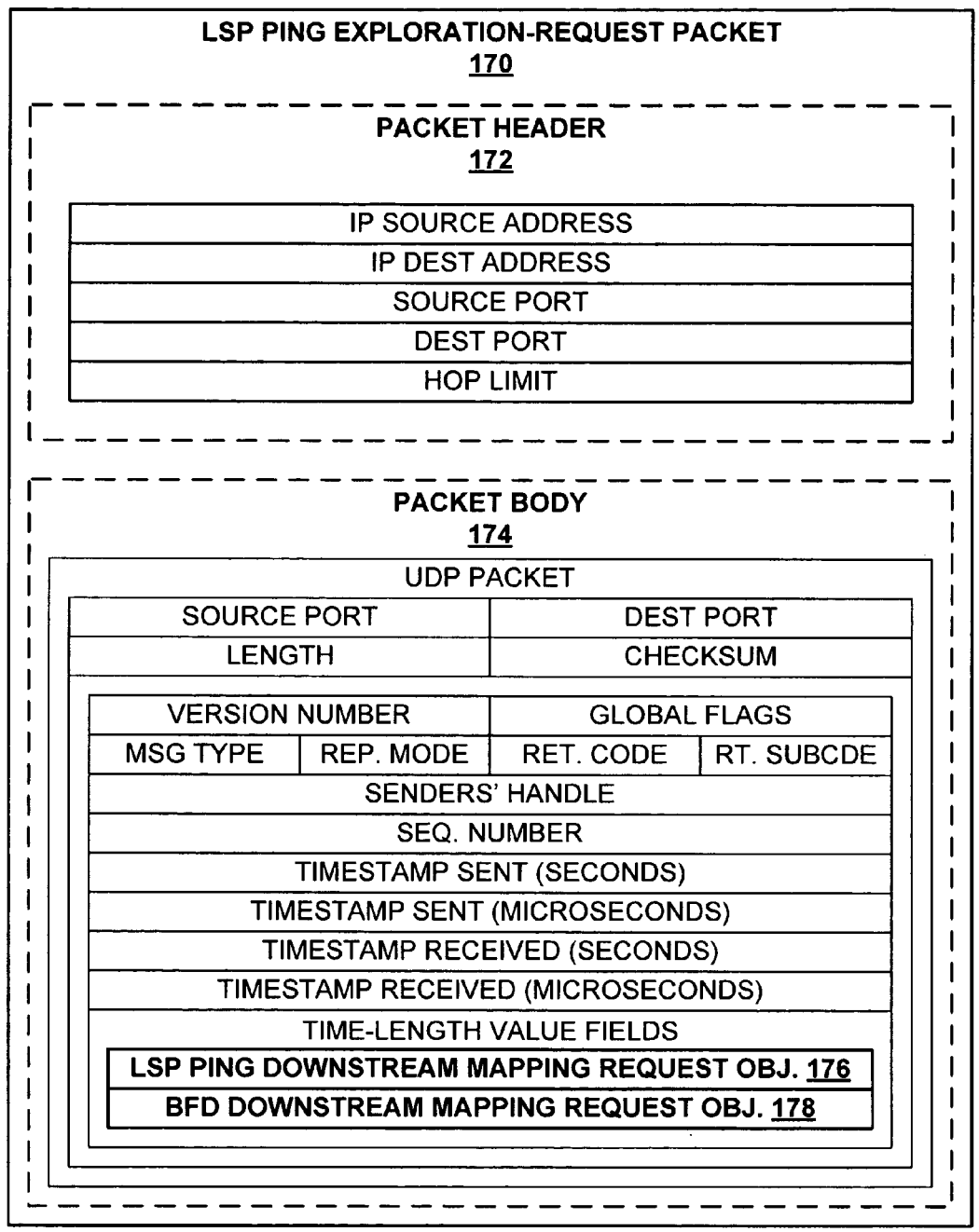
FIG. 4 is a block diagram illustrating an exemplary format of a LSP ping exploration packet that has been extended to facilitate the discovery of packet header information for the Bidirectional Forwarding Detection protocol.

FIG. 4 is a block diagram illustrating an exemplary format of a LSP ping exploration packet 170 that has been extended to facilitate the discovery of packet header information for the Bidirectional Forwarding Detection protocol. Packet 170 comprises a packet header 172 and a packet body 174.

As illustrated in FIG. 4, packet header 172 contains data fields consistent with Internet Protocol version 4 (IPv4) or Internet Protocol version 6 (IPv6). For instance, packet header 172 includes an IP source address, an IP destination address, and a hop limit. (In IPv4, hop limit 184 is referred to as "time-to-live".)

In the LSP ping protocol, packet body 174 consists of a User Datagram Protocol (UDP) packet. The data portion of this UDP packet contains LSP ping information. As illustrated in FIG. 4, the LSP ping information includes a version number, a set of global flag, a message type, a report type, a return code, a return subcode, a sender's handle, a sequence number, a timestamp sent (seconds) field, a timestamp sent (microseconds) field, a timestamp received (seconds) field, and a timestamp sent (microseconds) field. In addition, the LSP ping information contains a set of Type-Length-Value (TLV) fields. As described in the IETF draft, each TLV field contains a type field, a length field, and a value field. TLV fields may convey a wide range of information.

In accordance with the techniques of this invention, the TLV fields include an LSP ping downstream mapping request object 186. LSP ping downstream mapping request object 186 contains a set of destination addresses. In addition, the TLV fields include an LSP ping exploration packet contains a BFD downstream mapping request object 188. BFD downstream mapping request object 188 also contains a set of destination addresses.

When a node other than the destination node receives packet 170, the node uses the sets of destination addresses in downstream mapping request objects to generate subsets of the destination addresses that correspond to paths from the node that originated packet 170 to a node immediately downstream to the node that received packet 170.

Figure 5:
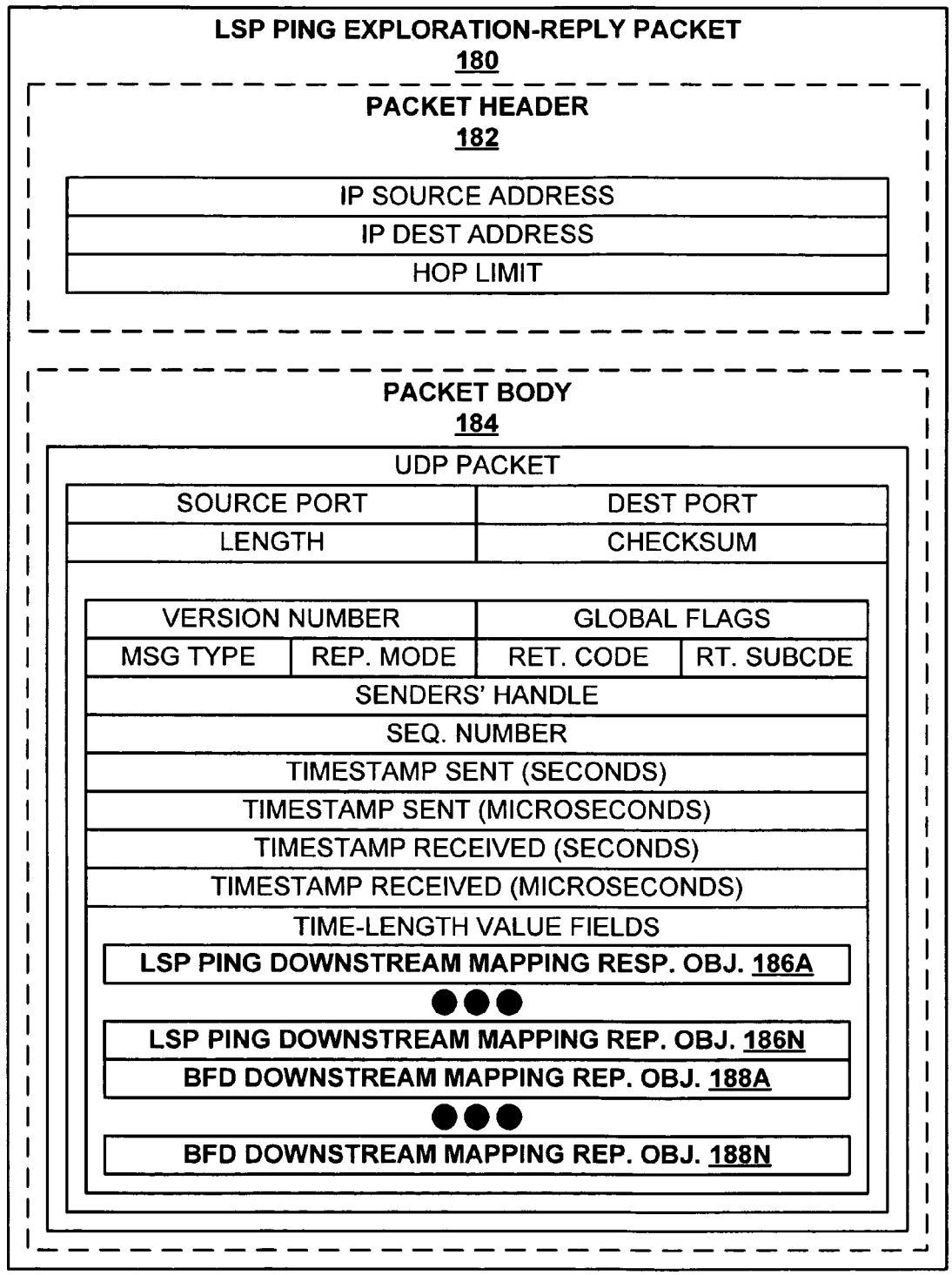
FIG. 5 is a block diagram illustrating an exemplary format of an LSP ping exploration-reply packet that has been extended to facilitate the discovery of packet header information for the Bidirectional Forwarding Detection protocol.

FIG. 5 is a block diagram illustrating an exemplary format of a LSP ping exploration-reply packet 180 that has been extended to facilitate the discovery of packet header information for the Bidirectional Forwarding Detection protocol. When a node other than the destination node of an LSP receives LSP ping exploration packet 170, the node examines the LSP ping exploration packet and may subsequently generate LSP ping exploration-reply packet 180.

As illustrated in FIG. 5, LSP ping exploration-reply packet 180 may have a similar structure to LSP ping exploration packet 170. For instance, LSP ping exploration-reply packet 180 includes a packet header 182 and a packet body 184. Moreover, packet header 182 contains an IP source address, an IP destination address, and a hop limit. In addition, packet body 184 contains a UDP packet complete with source port, destination port, length, and checksum. Like LSP ping exploration packet 170, the UDP packet in packet body 184 contains similarly structured LSP ping information.

Unlike LSP ping exploration packet 170, the TLV fields of LSP ping exploration-reply packet 180 may include LSP ping downstream mapping reply objects 186A through 186N (collectively, LSP ping downstream mapping reply objects 186) for each node on LSP 21 that is immediately downstream of the receiving node. Each of LSP ping downstream mapping reply objects 186 contains a subset of the destination addresses contained in LSP ping downstream mapping request object 186. In particular, this subset contains the destination addresses that will cause the receiving node to route an LSP ping packet having a destination address in the subset to a particular downstream node.

In addition, the TLV fields of LSP ping exploration-reply packet 180 may include BFD downstream mapping reply objects 188A through 188N (collectively, BFD downstream mapping reply objects 188) for each node on LSP 21 immediately downstream to the receiving node. BFD downstream mapping reply objects 188 may include information similar to LSP ping downstream mapping reply objects 186. In particular, each of BFD downstream mapping reply objects 188 contains a subset of the destination addresses contained in BFD ping downstream mapping request object 178. In particular, this subset contains the destination addresses that will cause the receiving node to route a BFD packet having a destination address in the subset to a particular downstream node.

Figure 6:
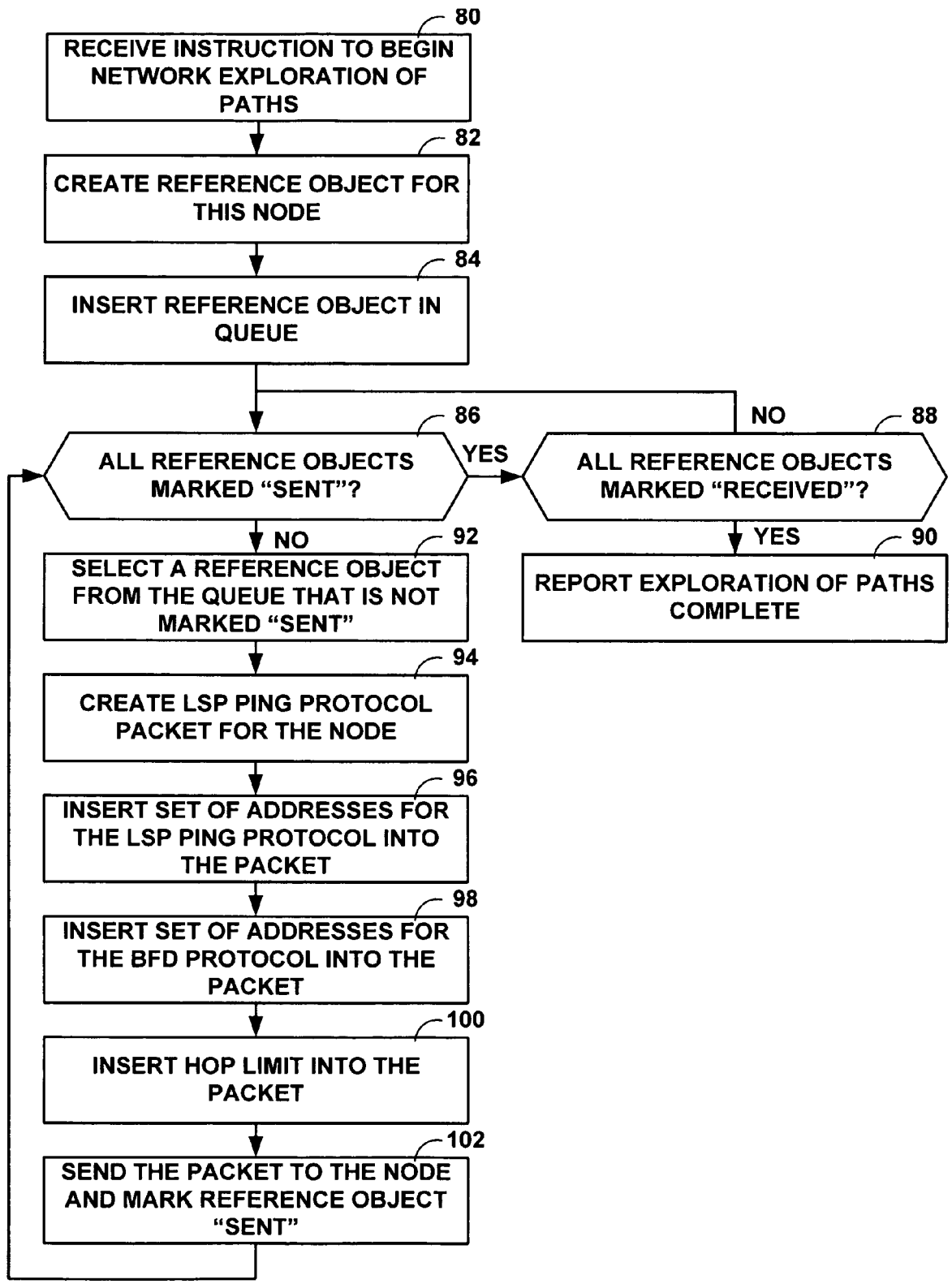
FIG. 6 is a flowchart illustrating an exemplary operation of a network exploration module of a node in accordance with the exemplary embodiment shown in FIG. 2.

FIG. 6 is a flowchart illustrating an exemplary operation of a network exploration module of a node in accordance with the exemplary embodiment shown in FIG. 2. Initially, network exploration module 46 receives instructions from routing engine 42 to begin an exploration process of a path to a destination node (80). After receiving the instructions, network exploration module 46 creates a reference object for router 30 (82). This reference may include the network address of router 30, a hop limit of 0, a set of destination addresses for the LSP ping protocol, and a set of destination addresses for the BFD protocol. Network exploration module 46 then inserts the reference object in a queue (84). After this point, network exploration module 46 may perform the same steps regarding router 30 as network exploration module 46 performs for any other node.

In particular, network exploration module 46 may check whether all of the reference objects in the queue are marked "sent" (86). If all of the reference objects in the queue are marked "sent" ("YES" of 86), network exploration module 46 may check whether all of the reference objects in the queue are marked "received" (88). If all of the reference objects in the queue are marked "received" ("YES" of 88), network exploration module 46 reports that the exploration process is complete (90). On the other hand, if one or more of the reference objects in the queue are not marked "received" ("NO" of 88), then network exploration module 46 loops back to check whether all reference objects in the queue are marked "sent" (86). If one or more of the reference objects in the queue are not marked "sent" ("NO" of 86), then network exploration module 46 selects a reference object from the queue that is not marked "sent" (92).

After selecting a reference object from the queue, network exploration module 46 creates an exploration packet in the LSP ping protocol for the node (94). Network exploration module 46 then extracts the set of destination addresses for the LSP ping protocol from the reference object and inserts the set of destination addresses for the LSP ping protocol into the exploration packet (96). Next, network exploration module 46 extracts the set of destination addresses for the BFD protocol from the reference object and inserts the set of destination addresses for the BFD protocol into the exploration packet (98). Network exploration module 46 then extracts the hop limit from the reference object and inserts the hop limit into the exploration packet (100). Once, network exploration module 46 inserts the hop limit into the exploration packet, network exploration module 46 may send the packet to the node referred to in the reference object and mark the reference object as "sent" (102).

Figure 7:
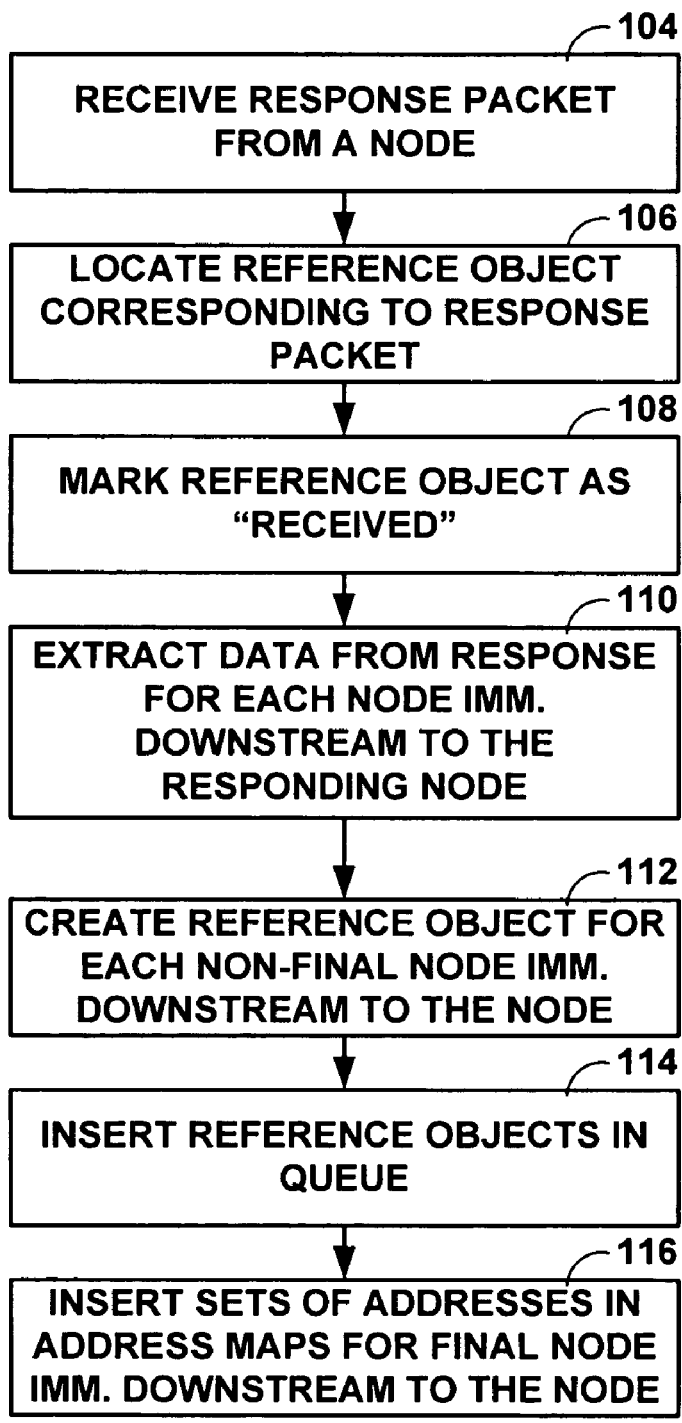
FIG. 7 is a flowchart illustrating an exemplary operation of an exploration module of a node in accordance with the exemplary embodiment shown in FIG. 2.

FIG. 7 is a flowchart illustrating an exemplary operation of a network exploration module when the network exploration module receives a response to an exploration packet in accordance with the embodiment of the invention shown in FIG. 2. Initially, network exploration module 46 receives a response packet from a node (104). After receiving the response packet, network exploration module 46 locates a reference object in the queue that corresponds to the response packet (106). Network exploration module 46 then marks this reference object as "received" (108).

After marking the reference object as "received", network exploration module 46 extracts data from the response packet for each of the nodes adjacent to the responding node (110). This data may include a set of destination addresses for the LSP ping and the BFD protocols for each of the nodes adjacent to the responding node. After extracting the data, network exploration module 46 creates a new reference object for each node immediately downstream to the responding node that is not the final node (112). This new reference object includes the set of destination addresses for the LSP ping and the BFD protocols for the node immediately downstream to the responding node. In addition, the new reference object includes the hop limit from the reference object that corresponds to the response incremented by one. Network exploration module 46 then inserts the new reference object in the queue (114). On the other hand, if one of the nodes immediately downstream to the responding node is the destination node, network exploration module 46 inserts the set of destination addresses for the LSP ping protocol into LSP ping address map 48 and inserts the set of destination addresses for the BFD protocol into BFD address map 50 (116).

Figure 8:
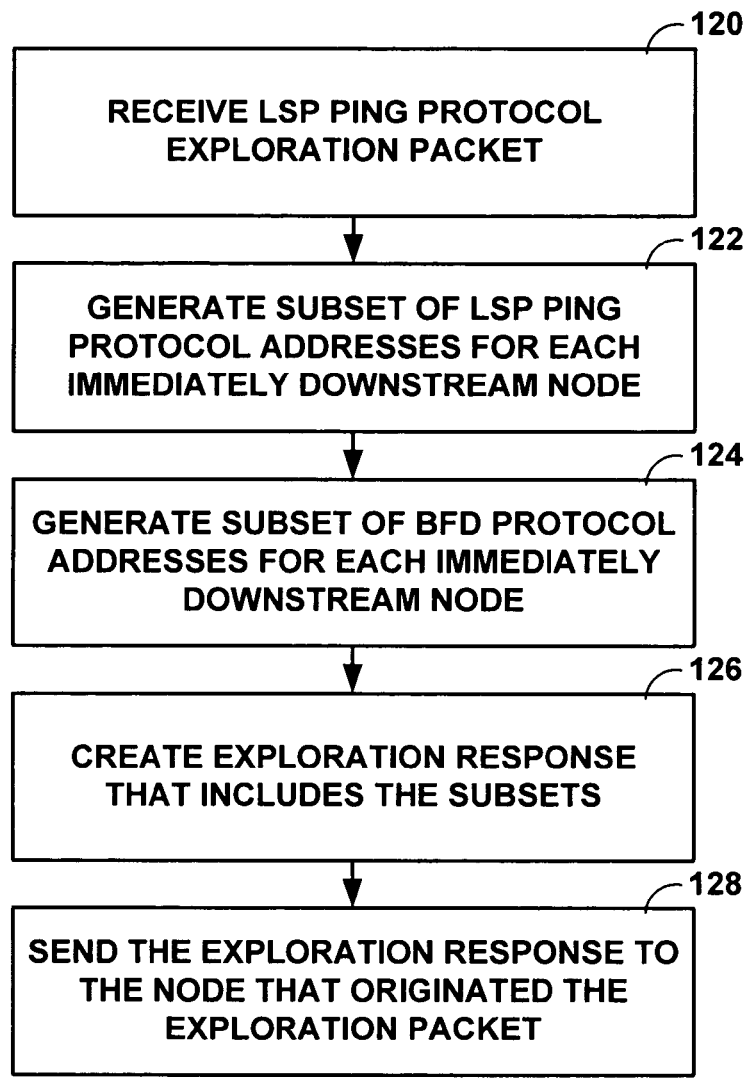
FIG. 8 is a flowchart illustrating an exemplary operation of a network exploration response module when the network exploration module receives a response to an exploration packet in accordance with the embodiment of the invention shown in FIG. 2

FIG. 8 is a flowchart illustrating an exemplary operation of an exploration response module of a node in accordance with the exemplary embodiment shown in FIG. 2. Initially, exploration response module 52 receives an exploration packet in the LSP ping protocol (120). Exploration response module 52 then generates a subset of destination addresses for the LSP ping protocol for each node immediately downstream to router 30 (122). Next, exploration response module 52 generates a subset of destination addresses for the BFD protocol for each node immediately downstream to router 30 (124).

After generating the subsets, exploration response module 52 creates an exploration response that includes the subsets (126). Exploration response module 52 then sends the exploration response to the node in computer network 2 that originated the exploration packet (128).

Various embodiments of the invention have been described. For example, FIG. 2 shows an embodiment of a node in computer network 2 that comprises a router that uses the LSP ping and BFD protocols to verify connectivity of an LSP. Nevertheless, many variations and modifications may be made without departing from the principles of this invention. For instance, a node in computer network 2 may comprise a personal computer or another network device. In addition, the techniques of this invention may be applicable to protocols other than the LSP ping and BFD protocols. These and other embodiments are within the scope of the following claims.

The invention claimed is:

1. A method of verifying connectivity of paths through a computer network containing a plurality of network devices, the method comprising:
   using a Label Switched Path (LSP) Ping protocol of a first one of the network devices to send an exploration packet to learn packet header information that will cause packets conforming to the LSP Ping protocol and packets conforming to a Bidirectional Forwarding Detection protocol to traverse individual paths in a set of paths through a computer network, wherein the exploration packet specifies a set of variable information of a packet header in accordance with the Bidirectional Forwarding Detection protocol;
   receiving the exploration packet with a second one of the network devices;
   generating, with the second one of the network devices, the packet header information to include a subset of the set of variable information for the BFD protocol, wherein the subset of variable information is associated with a path from the first network device to a third one of the network devices immediately downstream to the second network device;
   sending the subset of variable information for the BFD protocol from the second one of the network devices to the first network device in an exploration response packet in accordance with the LSP Ping protocol; and
   outputting packets, with the first network device, according to the Bidirectional Forwarding Detection protocol at a first rate in accordance with the learned packet header information to perform a first verification of a status of each of the paths.

2. The method of claim 1 further comprising outputting packets according to the LSP Ping protocol at a second rate in accordance with the learned packet header information to perform a second verification of a status of each of the paths.

3. The method of claim 1, wherein the packet header information that will cause a packet conforming to the LSP Ping protocol and a packet conforming to the Bidirectional Forwarding Detection protocol to traverse the individual paths is discovered concurrently.

4. The method of claim 1, further comprising sending a packet in the LSP Ping protocol on each path in the set of paths at a second rate to perform a second verification of a status of each of the paths, wherein the packet has the packet header information for the path.

5. The method of claim 4,
   wherein the exploration packet further includes a set of variable information of a packet header in the LSP Ping protocol, the method further comprising:
   generating the packet header information as a subset of the set of variable information for the LSP Ping protocol with the second one of the network devices, wherein information in the subset is associated with the path from the first network device to the third one of the network devices immediately downstream to the second network device;
   sending the subset of variable information for the LSP Ping protocol from the second one of the network devices to the first network device in the exploration response packet in accordance with the LSP Ping protocol; and
   receiving the subset of the set of variable information for the LSP Ping protocol with the first one of the network devices.

6. The method of claim 1, wherein outputting packets according to the Bidirectional Forwarding Detection protocol comprises sending a packet in the Bidirectional Forwarding Detection protocol on each path in the set of paths, wherein the packet has the packet header information for the path.

7. The method of claim 1, wherein outputting packets according to the Bidirectional Forwarding Detection protocol comprises:
   sending a packet in the Bidirectional Forwarding Detection protocol on a path in the set of paths, wherein the packet includes information from the subset of the set of variable information associated with the path received in the exploration response packet by the first one of the network devices; and
   receiving a response to the packet.

8. The method of claim 1, wherein the set of variable information comprises a set of destination addresses.

9. The method of claim 1, wherein the packet includes fixed information of a packet header in the Bidirectional Forwarding Detection protocol.

10. The method of claim 9, wherein the fixed information comprises a source address.

11. The method of claim 1, wherein the paths are multiple paths of a label switched path.

12. The method of claim 1, wherein the paths are label switched paths.

13. The method of claim 1, wherein the first network device uses the paths to communicate network traffic to a second one of the network devices in the computer network.

14. The method of claim 13, wherein the network traffic comprises Multi-protocol label switching traffic.

15. A network device coupled to a computer network having a plurality of nodes, the network device comprising:
   a network exploration module to learn information that will cause packets conforming to a Label Switched Path Ping protocol and packets conforming to a Bidirectional Forwarding Detection protocol to traverse individual paths in a set of paths through a computer network; and
   a first module to output packets according to the Bidirectional Forwarding Detection protocol at a first rate in accordance with the learned information to perform a first verification of a status of each of the paths; and
   an exploration response module to receive an exploration packet in the Label Switched Path Ping protocol that includes a set of variable information of a packet header in the Bidirectional Forwarding Detection protocol, wherein the exploration response module generates a subset of the set of variable information in response to the exploration packet, wherein information in the subset is associated with a path from a node that originated the exploration packet to a node immediately downstream to the network device, and wherein the exploration response module is further configured to send the subset to the node that originated the exploration packet.

16. The network device of claim 15, further comprising a second module to output packets according to the Label Switched Path Ping protocol at a second rate in accordance with the learned information to perform a second verification of a status of each of the paths.

17. The network device of claim 15, wherein the network exploration module concurrently learns the information that will cause packets conforming to the Label Switched Path Ping protocol and packets conforming to the Bidirectional Forwarding Detection protocol to traverse the individual paths.

18. The network device of claim 15, wherein the network exploration module discovers, with the Label Switched Path Ping protocol, for each path in the set of paths, packet header information that will cause a packet conforming to the Label Switched Path Ping protocol to traverse the path; and discovers with the Label Switched Path Ping protocol, for each path in the set of paths, packet header information that will cause a packet conforming to the Bidirectional Forwarding Detection protocol to traverse the path.

19. The network device of claim 18, further comprising a second module to output packets according to the Label Switched Path Ping protocol at a second rate in accordance with the learned information to perform a second verification of a status of each of the paths,
wherein the second module sends a packet in the Label Switched Path Ping protocol on each path in the set of paths, wherein the packet has the packet header information associated with the path.

20. The network device of claim 19,
wherein the network exploration module discovers packet header information that will cause a packet conforming to the Label Switched Path Ping protocol to traverse the path by sending a packet in the Label Switched Path Ping protocol to a first one of the nodes in the computer network, wherein the packet includes a set of variable information of a packet header in the Label Switched Path Ping protocol, and by receiving a subset of the set of variable information, wherein the information in the subset is associated with a path from the network device to a node immediately downstream to the first node.

21. The network device of claim 20, wherein a second module outputs packets according to the Label Switched Path Ping protocol by sending a packet in the Label Switched Path Ping protocol on a path in the set of paths, wherein the packet includes information from the subset of the set of variable information associated with the path and receiving a response to the packet.

22. The network device of claim 18, wherein the first module sends a packet in the Bidirectional Forwarding Detection protocol on each path in the set of paths, wherein the packet has the packet header information associated with the path.

23. The network device of claim 18, wherein the network exploration module discovers a packet header of the Bidirectional Forwarding Detection protocol by sending a packet in the Label Switched Path Ping protocol to a first one of the nodes in the computer network, wherein the packet includes a set of variable information of a packet header in the Bidirectional Forwarding Detection protocol; and by receiving a subset of the set of variable information, wherein information in the subset is associated with a path from the network device to a node immediately downstream to the first node.

24. The network device of claim 23, wherein the first module outputs packets according to the Bidirectional Forwarding Detection protocol by sending a packet in the Bidirectional Forwarding Detection protocol on a path in the set of paths, wherein the packet includes information from the subset of the set of variable information associated with the path; and by receiving a response to the packet.

25. The network device of claim 23, wherein the set of variable information comprises a set of destination addresses.

26. The network device of claim 23, wherein the packet includes fixed information of a packet header in the Bidirectional Forwarding Detection protocol.

27. The network device of claim 26, wherein the fixed information comprises a source address.

28. The network device of claim 15, wherein the multiple paths of a label switched path.

29. The network device of claim 15, wherein the paths are label switched paths.

30. The network device of claim 15, wherein the network device comprises a router.

31. The network device of claim 15, wherein the network device uses the paths to communicate network traffic to a first one of the nodes in the computer network.

32. The network device of claim 31, wherein the network traffic comprises Multi-protocol label switching traffic.

33. A non-transitory computer-readable medium comprising instructions for causing a programmable processor coupled to a computer network having a plurality of nodes to:
use a Label Switched Path (LSP) Ping protocol to learn information that will cause packets conforming to the Label Switched Path Ping protocol and packets conforming to a Bidirectional Forwarding Detection protocol to traverse a set of paths through a computer network, wherein the exploration packet includes a set of variable information of a packet header in accordance with the Bidirectional Forwarding Detection protocol;
receive the exploration packet with a second one of the network devices;
generate the packet header information as a subset of the set of variable information for the BFD protocol with the second one of the network devices, wherein information in the subset is associated with a path from the first network device to a third one of the network devices immediately downstream to the second network device;
send the subset of variable information for the BFD protocol from the second one of the network devices to the first network device in an exploration response packet in accordance with the LSP Ping protocol; and
output packets according to the Bidirectional Forwarding Detection protocol at a first rate in accordance with the learned information to perform a first verification of a status of each of the paths.

34. A method comprising:
outputting, with a first network device, a request that conforms to a first connectivity protocol to perform a first verification of a label switched path (LSP) having a plurality of alternative multipaths;
receiving the request with an intermediate node along the LSP;
generating, with the intermediate node, first packet header information that conforms to the first connectivity protocol and second packet header information that conforms to a second connectivity protocol, wherein the first packet header information and the second packet header information is associated with two or more of the plurality of alternative multipaths of the LSP downstream from the intermediate node;

sending the first packet header information and the second packet header information from the intermediate node to the first network device in a reply that conforms to the first connectivity protocol;

receiving the reply with the first one of the network devices, wherein the reply includes the first packet header information and the second packet header;

outputting packets that conform to the first connectivity protocol in accordance with the first packet header information to perform a first verification of a status of the specified two of the plurality of alternative multipaths of the LSP; and outputting packets that conform to the second connectivity protocol in accordance with the second packet header information to perform a second verification of a status of the specified two of the plurality of alternative multipaths of the LSP.

35. The method of claim 34, wherein the first connectivity protocol is a Label Switched Path Ping protocol and the second connectivity protocol is a Bidirectional Forwarding Detection protocol.

* * * * *